Figure 1:
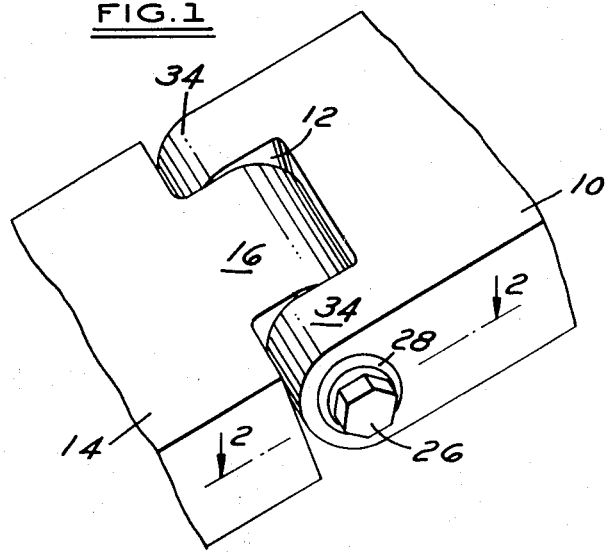

United States Patent

[11] 3,620,578

| [72] | Inventor | Joseph O. Fix<br>Utica, Mich. |
|---|---|---|
| [21] | Appl. No. | 880,264 |
| [22] | Filed | Nov. 26, 1969 |
| [45] | Patented | Nov. 16, 1971 |
| [73] | Assignee | The United States of America as represented by the Secretary of the Army |

[54] METHOD OF RETAINING INNER RACE OF BEARING FOR LUBRICATED PIN TRACK
8 Claims, 2 Drawing Figs.

[52] U.S. Cl. .................................... 305/11,
74/254, 305/58
[51] Int. Cl. .................................... B62d 55/28
[50] Field of Search ........................... 305/11, 58,
14, 42; 74/251–257

[56] References Cited
UNITED STATES PATENTS

| 1,973,214 | 9/1934 | Lamb | 305/42 |
| 2,391,524 | 12/1945 | Sorensen | 305/42 |
| 3,463,560 | 8/1969 | Reinsma | 305/11 |
| 3,504,951 | 4/1970 | Hirych | 305/11 |

FOREIGN PATENTS

| 1,090,531 | 10/1954 | France | 305/42 |

Primary Examiner—Richard J. Johnson
Attorneys—Harry M. Saragovitz, Edward J. Kelly, Herbert Berl and Maxwell V. Wallace ABSTRACT: Means for retaining an inner race for the bearing of a lubricated pin track. The inner race of the bearing is retained on a polygonal or splined pin by a sleeve, which in turn is stacked in place by bolts in the ends of the pin. The bearing member is sealed therein against foreign matter and provides a tight connection for its inner race, whereby the track can be separated without breaking into the sealed bearing area.

PATENTED NOV 16 1971 3,620,578

JOSEPH O. FIX
INVENTOR

BY Harry M. Saragovitz
Edward J. Kelly
Herbert Berl
& Maxwell V. Wallace
ATTORNEYS

METHOD OF RETAINING INNER RACE OF BEARING FOR LUBRICATED PIN TRACK

The invention described herein may be manufactured, used and licensed by or for the Government for governmental purposes without payment to me of any royalty thereon.

In the past tank treads used rubber bushings or what has been known as a dry pin. Actual experience with this type of tread proved the same offered limited life and/or track stretch.

Applicant discloses herein a new and improved means of retaining the inner race of a bearing for a lubricated pin track on its mounting pin. With the present improved arrangement of parts all that is necessary to separate a track is to remove a single bolt and pin from each bearing, which in turn separates the track without entering the sealed area. The seal precludes dirt and liquid from contacting the sealed bearing. The track is very easy to assemble and disassemble in the field and much cheaper than using adjustable bolts. It also provides a tighter connection for the bearing inner race and is more durable than extending a lug from the bearing inner race to prevent inner race rotation with respect to the pin. The above and other objects of the invention will appear more clearly from the following more detailed description, and from the drawing, wherein:

FIG. 1 is a perspective view of the track connector, and

Figure 2:
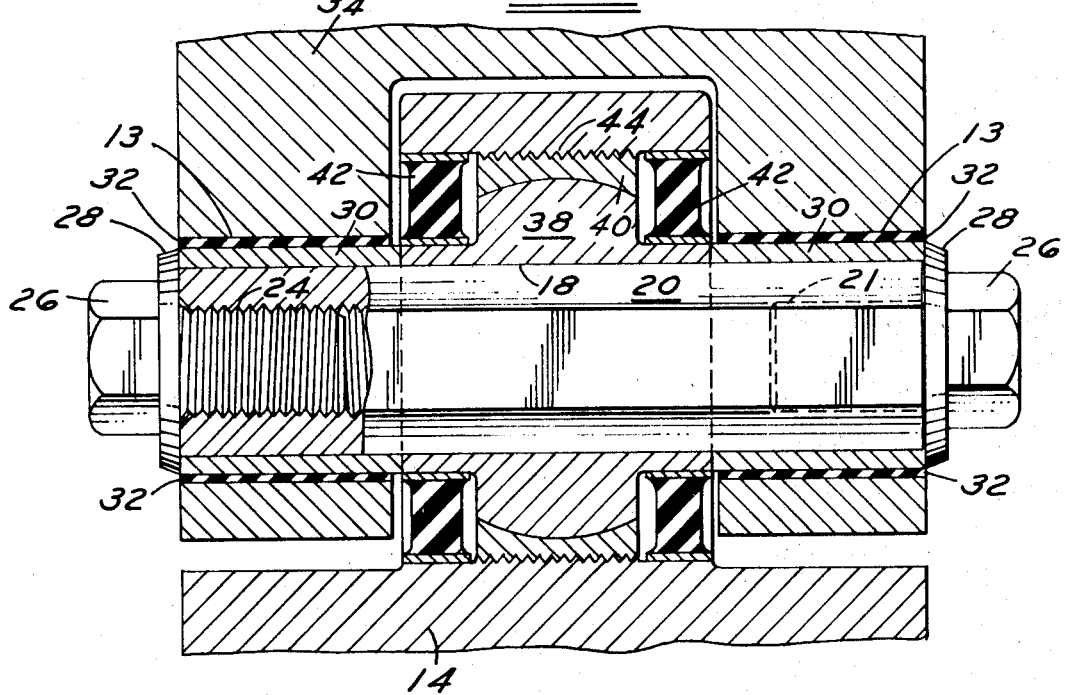

FIG. 2 is a section, taken substantially along line 2—2 of FIG. 1. Referring now to the drawing, the numeral 10 designates a section of tank tread, the same having formed therein a recess 12 and opposed projections 34 having aligned openings 13 therein, adapted to receive a section of track 14 having formed integrally therewith a bushing 16. Bushing 16 has therein a cored or longitudinal opening 18, the same being adapted to receive a splined or polygonal pin member 20, the same comprising a tube or sleeve, as shown in FIG. 2 of the drawing, and having internal threads 21 to receive a bolt 26. The opposed end of pin 20 is also threaded, as at 24, to receive an identical bolt member 26. The central portion of member 20 is hollow, opposed bolts 26 being threaded but a short distance into tube or pin 20. Identical washers 28 are interposed between bolts 26 and opposed projections 34 and act as a barrier between bolts 26 and pin sleeve 20.

Sleeve members 30 envelop portions of pin 20, and rubber or elastomeric bushings 32 are interposed between sleeves 30 and opposed projections 34. Bushing 16 also has mounted therein an inner race 38, splined or octagonal, rigidly mounted on pin 20, and an outer race 40 nonrotatably and rigidly mounted within the bearing chamber by means of threads 44. Opposed seal members 42 define a race chamber and prevent the entrance of foreign matter into the chamber. These seals are formed of resilient material and are of disclike configuration. As is best seen in FIG. 1, bushing 16 on tank tread section 14 fits between the spaced projections 34 on tank tread section 10.

The manner in which the device operates is as follows: bushing 16 is internally threaded at 44 to cooperate with mating external threads on outer race 40, and spherical bearing 38, 40 is threaded into place in bushing 16, after which seals 42 are pressed into place on opposite sides of bearing 38, 40. Bushing 16 is placed between spaced projections 34 with the openings aligned, and polygonal pin 20 is inserted in the similarly polygonal openings in sleeves 30 and inner race 38. Washers 28 are then applied onto the opposed ends of pin 20 and bolts 26 are turned into the threaded opposed ends of pin 20. When bolts 26 are tightened on pin 20, bushings 32 allow a slight axial movement of sleeve 30, to stack up sleeves 30 and inner race 38 into a solid rigid unit with pin 20.

The sections of tread 10, 14 are now securely joined.

With the instant device, all that is necessary to separate a track on a tracked vehicle is to quickly remove bolts 26 and remove pin 20 from opening 18 in bushing 16. This procedure allows the sections of track to separate and inasmuch as opposed seals 42 remain in place, foreign matter cannot enter the sealed bearing area.

Track equipped with the instant device is very easy to assemble and disassemble in the field because of its similarity in assembling and disassembling compared to the same procedures when using the old single-pin rubber bushed tracks. It is much cheaper than the use of adjustable bolts. The present invention provides a tighter connection for the inner bearing race and is more durable than extending a lug from bearing inner race 38 to opposed projections 34 to prevent the rotation of inner race 38.

If desired, a long headed bolt could be substituted for pin 20.

I wish it to be understood that I do not desire to be limited to the exact details of construction shown and described, for obvious modifications will occur to a person skilled in the art.

I claim:

1. An articulated endless track for track-laying vehicles, the track comprising a plurality of track elements, wherein:
   each track element is provided with a projecting bored bushing and a pair of spaced-apart bored projections, the bushing of each track element disposed between the spaced-apart projections of the next adjacent element;
   a pin engaging each set of cooperating projections and bushing; an inner bearing race on that portion of the pin disposed within said bushing and having
   nonrotating engagement with the pin,
   a convex spherical bearing surface, and
   a flange at each side of said convex bearing surface;
   an outer bearing race threadedly engaging a bore in the bushing and having a concave spherical bearing surface in load-supporting contact with said convex bearing surface;
   a resilient seal on each side of said bearing races, having an external surface in engagement with said bushing bore and an internal surface in engagement with one of said flanges, whereby the two seals define an enclosed and sealed space;
   a sleeve for each spaced projection in the radial space between said pin and the bore of said projection and having an inner face in contact with an adjacent flange; and
   means cooperating with said pin to clamp the inner race and the sleeves axially into a solid unit with said pin.

2. A track as in claim 1, wherein the axial length of each sleeve is greater than the axial length of its associated projection.

3. A track as in claim 1, and a resilient sleeve for each spaced projection and disposed between the first-named sleeve and the bore of said projection.

4. A track as in claim 3, wherein the axial length of each sleeve is greater than the axial length of its associated projection.

5. A track as in claim 1, wherein the last-named means includes a washer at each end of the pin
   in clamping engagement with the outer end of the adjacent sleeve and
   a securing device clamping the washer and removably engaging the pin.

6. A track as in claim 5, wherein the securing device is a bolt having a threaded portion engaging the pin and a head larger than the threaded portion engaging the washer.

7. A track as in claim 6, and a resilient sleeve for each spaced projection and disposed between the first-named sleeve and the bore of said projection.

8. A track as in claim 7, wherein the axial length of each sleeve is greater than the axial length of its associated projection.

* * * * *